United States Patent Office 2,898,261
Patented Aug. 4, 1959

2,898,261

METHOD AND COMPOSITION FOR DESTROYING NEMATODES

Charles R. Youngson, Long Beach, Calif., assignor to The Dow Chemical Company, Midland, Mich., a corporation of Delaware No Drawing. Application April 5, 1957
Serial No. 650,871

7 Claims. (Cl. 167—22)

The present invention relates to the treatment of soil and is particularly concerned with a new agronomical practice and composition for improving the plant growing properties of soil and for controlling soil-dwelling invertebrate organisms which attack plant roots.

It is an object of the present invention to provide a new and improved agronomical practice for improving the plant growing properties of soil and the ability of soil to support plant growth. An additional object is the provision of a new agronomic practice for improving the growth characteristics of plants and for stimulating the growth of crops. A further object is the provision of a new method for improving the emergence, seedling growth and harvest of crop plants. Another object is the provision of a new practice for protecting the roots of plants from the attack of soil-dwelling invertebrate organisms such as nematodes. A further object is the provision of a novel composition adapted to be employed in the new practice for improving the plant growing properties of soil. Other objects will become apparent from the following specification and claims.

According to the present invention, it has been discovered that the plant growing properties of soil may be improved by treating soil or growth media with an aminothioxomethanesulfonate having the formula

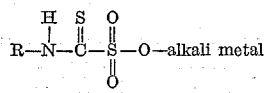

wherein R represents lower alkyl, allyl or propargyl. The expression lower alkyl is employed in the present specification and claims to refer to the alkyl radicals containing from 1 to 3 carbon atoms, inclusive. It has been further found that such treatment of growth media protects the plants from the ravages of soil-dwelling invertebrate organisms which attack their roots and stimulates the growth and improves the growth characteristics of plants. Thus for example, crops raised on the treated soil have more luxuriant tops and roots and are of a greater total weight than those normally obtained from untreated soil. The sulfonate compounds as employed in accordance with the present invention are solid materials somewhat soluble in alcohol and water and of very low solubility in xylene, kerosene, acetone and petroleum distillates. The compounds are adapted readily and conveniently to be distributed in soil or growth media. When so distributed, the compounds accomplish a rapid control of root-attacking organisms such as nematodes. It is among the advantages of the present invention that the compounds are sufficiently persistent to accomplish the desired effect upon the soil dwelling organisms or to achieve the changes in the soil which accomplish improved growth characteristics but dissipate from the soil in a reasonable period of time.

The distribution in soil or growth media of a dosage of the sulfonate compounds effective to improve the plant growing properties of the soil is essential for the practice of the present invention. In general, good results are obtained when the compounds are distributed through growth media in the amount of from about 10 to 200 parts or more by weight per million parts by weight of the medium. In field applications, the sulfonate compounds may be distributed in soil at a dosage of from 10 to 250 pounds or more per acre and through such a cross-section of the soil as to provide for the presence therein of an effective concentration of the treating agents. In general field applications, it is usually preferred that the compounds be distributed to a depth of at least 3 inches.

In one embodiment of the invention, the treated soil is planted with the desired crop plant following the distribution of the sulfonate compounds in the soil. Where minimum dosages of the compounds are distributed in soil, the treated soil may be immediately planted with the desired crop. Following the distribution of larger dosages of the sulfonate compounds, it is desirable that any planting operation not be carried out for a period of from several hours to several days, the exact period depending upon the concentration of the compound in the soil and the resistance of the species concerned to the compounds. Where the sulfonate compounds are employed for the treatment of the soil adjacent to the root systems of established plants having a resistance to the compounds and in side-dressing operations, the existing vegetation is not unfavorably effected by minimum effective concentrations of the compounds temporarily present in the soil.

The method of the present invention may be carried out by distributing the unmodified aminothioxomethanesulfonate compounds through the growth media as by impregnation. However, the present method also embraces the employment of a liquid or dust composition containing the sulfonate compounds. In such usage, the compounds may be modified with one or more of a plurality of additaments or soil treating or parasiticide adjuvants, including water or organic liquid carriers such as petroleum distillates, surface-active dispersing agents and finely divided solids. Depending upon the concentration of toxicant, such augmented compositions are adapted to be distributed in the soil, or employed as concentrates and subsequently diluted with additional inert carrier to produce the ultimate treating compositions. The required amount of the sulfonate compounds in the growth media conveniently may be supplied per acre treated in from 10 to 27,000 gallons or more of the aqueous carrier, in from 1 to 50 gallons of organic liquid carrier, or in from 20 to 2,000 pounds or more of the solid carrier.

The exact concentration of the sulfonate compounds to be employed in compositions for the treatment of growth media may vary provided the required dosage of effective agent is supplied in the soil. The concentration of the compounds in organic liquid compositions employed to supply the desired dosage is generally from about 10 to 85 percent by weight. With aqueous compositions, the required dosage is generally supplied with compositions containing 0.1 to 50 percent by weight, although concentrations of 0.0001 percent by weight conveniently may be employed in the irrigation treatment of soil. In dusts, the concentrations of toxicant may be from 1 to 50 percent by weight, although concentrations as low as 0.1 percent by weight are sometimes employed. In compositions to be employed as concentrates, the toxicant oftentimes is present in a concentration of from 5 to 95 percent by weight.

Liquid compositions containing the desired amount of the sulfonate compounds may be prepared by dissolving the toxicants in a liquid such as alcohol or water. The aqueous compositions may contain a surface active dispersing agent such as an ionic or non-ionic emulsifying agent. The preferred surface active agents are oil-soluble and include the non-ionic emulsifiers such as the condensation products of alkylene oxide with phenols and organic acids, polyoxyethylene derivatives of sorbitan esters, complex ether alcohols and the like. However, oil-soluble ionic emulsifying agents such as mahogany soaps may also be used.

Similarly, the sulfonate compounds may be compounded with water, a suitable surface active agent, and a water-immiscible organic liquid such as a petroleum distillate to produce water-in-oil emulsions. Preferable surface active agents to be employed in these compositions are oil-soluble and include the glycols, glycerol and sorbitan fatty acid esters and the fatty acid salts such as calcium stearate. In the water-in-oil emulsions and aqueous dispersions, the surface active agents are generally employed in the amount of from 1 to 20 percent by weight of the combined weight of the agent and sulfonate compound in the composition.

In the preparation of dust compositions, the sulfonate compounds are dispersed in and on a finely divided inert solid such as talc, chalk, gypsum and the like. In such operations, the carrier is mechanically ground with the compound or wet with a volatile organic solvent solution thereof. Similarly, dust compositions containing the compounds may be prepared from various of the solid surface-active dispersing agents, such as bentonite, fuller's earth, attapulgite and other clays. Depending upon the proportion of ingredients, these dust compositions may be employed as concentrates and subsequently diluted with additional solid surface-active dispersing agent or with talc, chalk or gypsum and the like to obtain the desired amount of active ingredient in a composition adapted to be employed for the treatment of soil. Also, such concentrate dust compositions may be dispersed in water with or without the aid of a dispersing agent to form aqueous soil treating compositions.

When operating in accordance with the present invention, the soil may be impregnated with the amiothioxomethanesulfonate compounds or a composition containing the compounds, in any convenient fashion, for example, by simple mixing with the soil, by applying to the surface of soil and thereafter dragging or discing into the soil to the desired depth, or by employing a liquid carrier to accomplish the penetration and impregnation.

In a preferred embodiment of the invention, the compounds are distributed in the soil by introduction in the water to be employed to irrigate the soil. In such procedure, the amount of water may be varied in accordance with the moisture content and the moisture equivalent or field capacity of the soil in order to obtain the desired depth of distribution of the toxicant compounds. In such method, the sulfonate compounds readily and conveniently may be distributed to a depth of from two to four feet or more to avoid reinfestation from deep-dwelling organisms.

The expressions "growth media" or "soil" are employed in the present specification and claims in their broadest sense to be inclusive of all conventional "soils," as defined in Webster's New International Dictionary, second edition, unabridged, published in 1937 by G. and C. Merriam Company, Springfield, Massachusetts. Thus, the terms refer to any solid substances or media in which vegetation may take root and grow and are intended to include not only earth, but also compost, manure, muck, humus and sand and the like, adapted to support plant growth.

The following examples illustrate the invention but are not to be construed as limiting the same.

*Example 1*

A water-dispersible concentrate composition containing 0.5 gram of potassium (allylamino)thioxomethanesulfonate per 5 milliliters of water was dispersed in water to prepare an aqueous composition containing about 160 parts by weight of the sulfonate compound per million parts of ultimate composition. This composition was employed in the treatment of areas of sandy loam soil of good nutrient content heavily infested with root-knot nematodes. In the treating operations, the composition was applied to the soil as a drench and at a rate of about 5.7 acre-inches of aqueous composition per acre to supply 26 parts by weight of the sulfonate compound per million parts by weight of soil. Seven days after treatment, sections of soil were taken from the treated areas at various depths below the soil surface, the sections placed in seed beds and the beds thereafter planted with cucumber seeds. In an exactly analogous fashion, sections of soil were taken from areas of similarly infested but untreated soil, and the sections placed in seed beds and planted with cucumber seeds to serve as checks. Seven weeks after seeding, the plants were lifted from the soil, their roots washed and the latter examined for galls attributable to root-knot nematode disease. The depth below the soil surface at which the sections of soil were procured and the percent control of nematodes obtained in these soil sections are set forth in the following table.

| Depth Below Soil Surface in Inches at Which the Sections of Soil Were Obtained | Percent Control of Root-Knot Nematodes |
|---|---|
| 1–3 | 100 |
| 3–6 | 100 |
| 9–12 | 100 |
| 15–18 | 78 |

At the time of the observations, the check plants were found to be stunted and their roots covered with galls attributable to root-knot nematodes.

*Example 2*

Fifty parts by weight of sodium (methylamino)thioxomethanesulfonate and 5 parts by weight of a dimeric alkylated aryl polyether alcohol (Triton X–155) are mixed together to prepare a water-dispersible concentrate composition.

Also a water-dispersible concentrate is prepared by mechanically mixing together 90 parts by weight of potassium (proparglylamino)thioxomethanesulfonate and 10 parts by weight of a sorbitan monolaurate polyethylene derivative (Tween 20).

These compositions are adapted to be dispersed in water to produce aqueous compositions having desirable wetting and penetrating properties. The latter aqueous compositions are adapted to be employed to treat soil and distribute the salt compounds therein in effective concentrations.

*Example 3*

An aqueous solution containing 0.1 pound of sodium (propylamino)thioxomethanesulfonate per 100 gallons of ultimate mixture is employed for the treatment of sandy loam soil which is heavily infested with root-knot nematodes. In the treating operations, the composition is applied to the soil areas as a drench and at a dosage of 12.5 pounds of the sulfonate compound per acre. This corresponds to about 20 parts by weight of the sulfonate compound per million parts by weight of soil. Other soil areas are left untreated to serve as checks.

After one week, the treated and untreated soil areas are planted with tomato seeds. During the subsequent growing period, there is observed no adverse effects upon germination and growth of the seeds and emerging seedlings attributable to the toxicant compound. About 5 weeks after seeding, the plants are lifted from the soil, their roots washed and the latter examined for galls attributable to nematode attack. The examination indicates substantially complete control of nematodes is obtained in the treated soil. At the time of the observations, the plants from the untreated check soil are found to be stunted and their roots covered with galls atrributable to nematode attack.

Example 4

A water-dispersible concentrate composition containing 0.5 gram of potassium (ethylamino)thioxomethanesulfonate per 5 milliliters of water was dispersed in water to prepare an aqueous composition containing about 160 parts by weight of the sulfonate compound per million parts of ultimate composition. This composition was employed for the treatment of areas of sandy loam soil of good nutrient content heavily infested with root-knot nematodes. In the treating operations, the composition was applied to the soil as a drench and at a rate of about 5.7 acre-inches of aqueous composition per acre to supply 26 parts by weight of the sulfonate compound per million parts by weight of soil. Seven days after treatment, sections of soil were taken from the treated areas at various depths below the soil surface, the sections placed in seed beds and the beds thereafter planted with cucumber seeds. In an exactly analogous fashion, sections of soil were taken from areas of similarly infested but untreated soil, and the sections placed in seed beds and planted with cucumber seeds to serve as checks. Seven weeks after seeding, the plants were lifted from the soil, their roots washed and the latter examined for galls attributable to root-knot nematode disease. The depth below the soil surface at which the sections of soil were procured and the percent control of nematodes obtained in these soil sections are set forth in the following table.

| Depth Below Soil Surface in Inches at Which the Sections of Soil Were Obtained | Percent Control of Root-Knot Nematodes |
|---|---|
| 1-3 | 98 |
| 3-6 | 100 |
| 9-12 | 100 |
| 15-18 | 96 |

At the time of the observations, the check plants were found to be stunted and their roots covered with galls attributable to root-knot nematodes.

The compounds employed in accordance with the present invention conveniently may be prepared as described in Receuil des Travaux Chimiques 54, 57–61 (1935), by mixing two molecular proportions of a suitable isothiocyanate (RN:C:S) and one molecular proportion of an alkali metal bisulfite in the presence of 50 percent ethanol and heating the resulting mixture to the boiling temperature and under reflux for 10 hours.

I claim:

1. A method of treating nematode infested soil to improve its plant growing properties which comprises impregnating said soil with a nematocidal concentration of an active agent effective to improve said properties, the active agent being a sulfonate compound having the formula

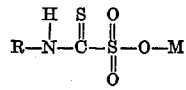

wherein R represents a member of the group consisting of lower alkyl, allyl and propargyl, and M represents a member of the group consisting of sodium and potassium.

2. A method as claimed in claim 1 wherein the active ingredient is potassium (allylamino)thioxomethanesulfonate.

3. A method as claimed in claim 1 wherein the active ingredient is potassium (ethylamino)thioxomethanesulfonate.

4. In the practice of agricultural economy, the method for the control of nematodes which comprises impregnating nematode infested soil with a sulfonate compound in the amount of at least 10 parts by weight per million parts by weight of soil, the sulfonate compound having the formula

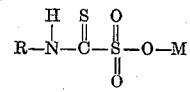

wherein R represents a member of the group consisting of lower alkyl, allyl and propargyl, and M represents a member of the group consisting of sodium and potassium.

5. In the practice of plant husbandry, the method for the control of nematodes which comprises impregnating nematode infested soil with a composition comprising a sulfonate compound as an active ingredient in admixture with a soil treating adjuvant, the sulfonate compound having the formula

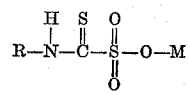

wherein R is a member of the group consisting of lower alkyl, allyl and propargyl, and M represents a member of the group consisting of sodium and potassium, said impregnation being carried out at a dosage of at least 10 parts by weight per million parts by weight of soil.

6. A composition which comprises a sulfonate compound as an active ingredient in intimate admixture with an emulsifying and dispersing agent, the active ingredient being a sulfonate having the formula

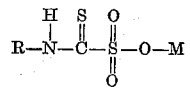

wherein R is a member selected from the group consisting of lower alkyl, allyl, and propargyl, and M represents a member selected from the group consisting of sodium and potassium.

7. An aqueous dispersion of the composition claimed in claim 6, the sulfonate compound being present in an amount of at least 0.0001 percent by weight.

References Cited in the file of this patent

UNITED STATES PATENTS

| 2,744,898 | Harmon et al. | May 8, 1956 |
| 2,766,554 | Dorman et al. | Oct. 16, 1956 |

OTHER REFERENCES

Receuil des Travaux Chimiques 54, pp. 57–61 (1935).